United States Patent [19]

Andringa

[11] 4,006,989

[45] Feb. 8, 1977

[54] LASER GYROSCOPE

[75] Inventor: Keimpe Andringa, Sherborn, Mass.

[73] Assignee: Raytheon Company, Lexington, Mass.

[22] Filed: Dec. 11, 1974

[21] Appl. No.: 531,836

Related U.S. Application Data

[60] Division of Ser. No. 294,394, Oct. 2, 1972, Pat. No. 3,854,819, which is a continuation-in-part of Ser. No. 120,581, March 3, 1971, Pat. No. 3,741,657.

[52] U.S. Cl. .................................. 356/106 LR
[51] Int. Cl.² .................................. G01B 9/02
[58] Field of Search ......................... 356/106 LR

[56] References Cited

UNITED STATES PATENTS 3,854,819  12/1974  Andringa .................. 356/106 LR

*Primary Examiner*—Vincent P. McGraw
*Attorney, Agent, or Firm*—Milton D. Bartlett; Joseph D. Pannone; David M. Warren

[57] ABSTRACT

A laser gyroscope system which detects frequency shifts in which waves are propagated along a path in opposite directions at different frequencies to minimize interaction between the waves with frequency separation of the waves maintained by both reciprocal and nonreciprocal polarization dispersion in which frequencies of the two waves propagating in one direction lie between the two frequencies of waves propagating in the opposite direction. Rotation of the system produces shifts of the frequencies so that variation in the difference between the separation between the two upper frequencies, which propagate in opposite directions, and the separation between the two lower frequencies, which propagate in opposite directions, is used to measure rotation rate.

10 Claims, 3 Drawing Figures

LASER GYROSCOPE

CROSS REFERENCE TO RELATED APPLICATIONS

This is a division of application Ser. No. 294,394 filed Oct. 2, 1972, issuing on Dec. 17, 1974 into U.S. Pat. No. 3,854,819, which is a continuation in part of application Ser. No. 120,581 filed Mar. 3, 1971, now U.S. Pat. No. 3,741,657.

BACKGROUND OF THE INVENTION

Laser gyroscopes have been proposed in which waves travel in opposite directions through a laser medium so that rotation of the laser medium about an axis will produce a difference frequency. However, unless the frequencies of the waves are spaced a substantial distance apart, the coupling of the wave propagating in one direction with the wave propagating in the opposite direction in the laser material can produce a combined laser action pulling the two frequencies toward each other and producing a condition known as lock-in.

Lock-in limits the use of laser gyroscopes since at low rotation rates where lock-in normally occurs, the output drops to zero, producing a range of rotation rates where there is no output since the clockwise and counterclockwise waves have the same frequency. Coupling between the waves may occur in many ways, including back scattering of energy from elements of the laser system such as window interfaces or other transitions from one medium into another.

Another possible source of coupling within the laser medium itself occurs when two waves travelling in opposite directions are in an instantaneous phase relationship where they compete for gain from atoms having a low velocity in the direction of propagation of the waves. The probablity of lock-in which affects the width of the inaccurate zero output region of the gyro in general will increase as the loop gain of the laser increases.

If the frequencies are spaced apart a substantial distance, for example by the use of devices that produce different delays in one direction than in the other, this frequency difference must be accurately maintained. Attempts to achieve an accurate frequency separation by switching a Faraday rotator from one condition to another have proved impractical since the accuracy of the AC switching waveform must be perfectly symmetrical to a degree substantilly greater than one part in $10^6$.

In addition, if a non-switched Faraday rotator were used to produce the different frequencies for opposite propagation directions, variations in the Faraday rotator could produce frequency variations greater than the dyroscopic rotational frequency changes, hence rendering the system inaccurate.

SUMMARY OF THE INVENTION

In accordance with this invention, two pairs of waves propagating in opposite directions are maintained spaced in frequency to substantially reduce coupling to each other, and frequency shifts due to changes in operating temperature, supply energy levels or mechanical movement of elements of the system with respect to each other will substantially cancel so that the overall output of the system will be unaffected by such changes.

More specifically, this invention provides for a ring laser having at least a plurality of waves propagating in each direction around the laser ring path. A plurality of different oscillation frequencies are propagated in each direction around the ring path. The propagation times of the waves are such that the frequencies of a pair of waves travelling in one direction through the laser lie between the frequencies of a pair of waves travelling in the opposite direction through the laser. Movement of the laser ring path, for example by rotation of the system about an axis perpendicular to the path, produces frequency shifts of the pair of waves propagating in one direction through the laser which are opposite to the frequency shifts of waves moving in the opposite direction through the laser. This produces a deviation in the frequency separation between the lower frequency of each of said pairs which is opposite to the deviation in the frequency separation between the higher frequency of each of said pairs, and total deviation, obtained by subtracting one deviation from the other, is a substantially linear function of the rate of said rotation and the sign of said total deviation indicates the direction of said rotation. A substantially more accurate measure of the rate of rotation of the system can be achieved by such a system than by mechanical gyroscope systems.

Since frequency shifts due to variations in power supply input, mechanical vibrations of components, or thermal variations in the system will shift all frequencies substantially equally because all the waves travel through the same components, the separations of the higher and lower frequencies of each pair will deviate in the same direction, hence resulting in a zero total deviation. Therefore, such frequency shifts introduce no substantial errors into the system.

This invention also provides for operating the system such that the lower frequency of each pair is positioned below the maximum gain frequency of the laser transition resonance energy band, while the upper frequency of each pair is positioned above said maximum gain frequency. More specifically, the frequencies of each pair are maintained substantially equidistant above and below the maximum gain or center frequency of the laser by any desired means, such as varying the path length of all the waves as a function of the difference between the amplitude of the two lower frequencies and the two upper frequencies. In general, the laser has a substantially Gaussian distribution of frequency versus gain, and any tendency of the two upper and/or two lower frequencies to pull together due to the slope of the gain curve, or variations therein, will cause the separation between the two lower frequencies and the separation between the two upper frequencies to deviate in the same direction. Therefore, the total deviation in these frequency separations is substantially zero for variations in system amplification.

While many materials may be used to produce the different propagation times for different frequencies, this invention discloses a particular frequency dispersive element in which all the dispersion occurs in one medium by making use of different polarizations of waves. More specifically, a pair of circularly polarized waves of opposite sense travel in each direction through the medium. By the selection of a medium such as a quartz crystal oriented for the waves to travel along the optical axis, the delay time for a wave of one polarization will be different from the delay time of a wave of a different polarization. The difference in delay time, which is reciprocal and which results in the different frequencies, may be selected by selecting the length of the quartz crystal.

In addition, the small Faraday effect, which many crystals will exhibit, is used to produce a non-reciprocal change in the delay time for circularly polarized waves travelling in opposite directions through the crystal so that the delay time is different for a wave of one polarization passing through the crystal in one direction from the delay time of a wave of the same polarization passing through the crystal in the opposite direction.

The amount of Faraday rotation produced varies with the strength of the magnetic field applied axially parallel to the propagation direction through the crystal, and the direction of the Faraday rotation can be reversed by reversing the direction of the magnetic field. Variations in the magnetic field will cause shifts in all four frequencies of the system, with shift in the frequencies of one sense of polarization moving in an opposite direction since the waves of that polarization sense of rotation are also travelling in opposite directions through the Faraday rotator. As a result, variations in the magnetic field will cause separation between the upper frequency of each pair and separation between the lower frequency of each pair to deviate in the same direction so that the total deviation is zero. Accordingly, these frequency shifts do not substantially affect the output of the gyroscope.

DESCRIPTION OF THE DRAWINGS

Other and further objects and advantages of the invention will become apparent as the description thereof progresses, reference being had to the accompanying drawings wherein.

DESCRIPTION OF THE PREFERRED EMBODIMENT

Figure 1:
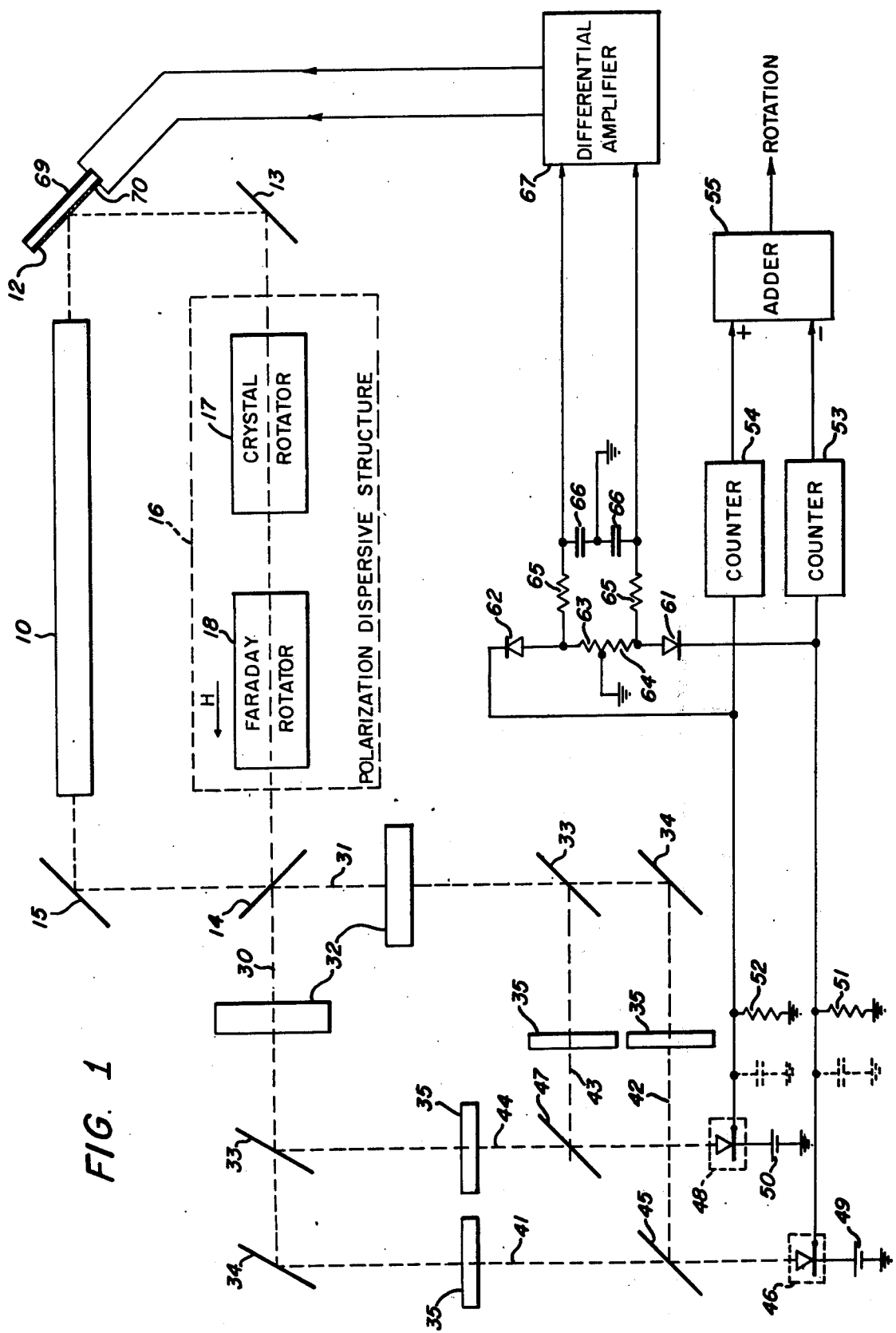
FIG. 1 illustrates a diagrammatic view of a ring laser embodying the invention.
Figure 2:
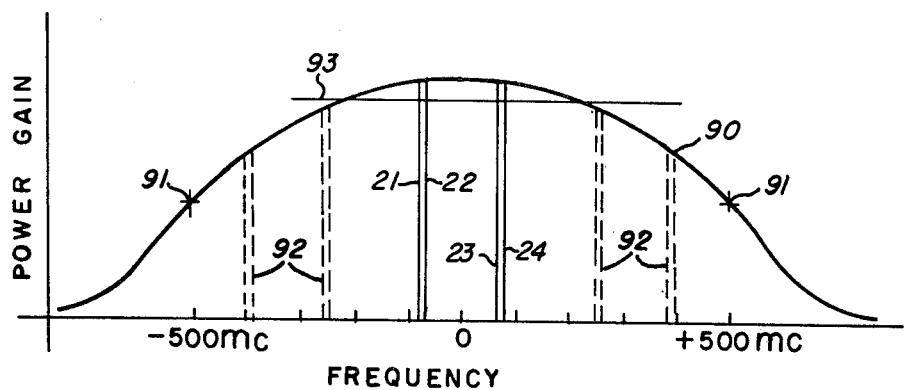
FIG. 2 illustrates a diagram of operating characteristics of the system illustrated in FIG. 1.

Referring now to FIG. 1 and FIG. 2, there is shown a laser gyroscope system having a laser amplifier medium 10. A ring path for the laser beams is produced by four reflectors 12, 13, 14 and 15, positioned at 45° with respect to the path of the waves through the axis of the laser 10, and defining the rectangular path with the laser amplifier 10 in one leg of the path.

Positioned in the opposite leg of the rectangle from the laser 10 is a polarization dispersive structure 16 which delays waves of different polarizations by different amounts. Structure 16 may be, for example, a conventional quartz crystal rotator 17 having its optical axis parallel to the laser path, and a conventional Faraday rotator 18 having its magnetic field parallel to the path of the laser wave.

Crystal rotator 17 produces a delay for circularly polarized waves that is different for one sense of circular polarization than for the opposite sense and is reciprocal, that is, a wave travelling in either direction through the crystal will be delayed the same amount. Faraday rotator 18 also delays circularly polarized waves but is non-reciprocal, that is, it rotates a circularly polarized wave of one sense propagating through the rotator in one direction in a positive sense, or increases the amount of rotation, but rotates the same sense of circularly polarized wave propagating through the rotator in the same direction in a negative sense, or decreases the amount of rotation.

Since change in the total amount of delay changes the electrical path length, and since an integral number of wavelengths around the laser beam path, defined by elements 10, 11, 12, 13, 14, 15, 17 and 18, is required to produce oscillations, four frequencies of oscillation are produced. The frequencies in FIG. 2 corresponding to 21 and 22 may be, for example, produced by left hand circularly polarized waves with the frequency 21 travelling in a clockwise direction about the laser system illustrated in FIG. 1 and the frequency 22 travelling in a counterclockwise direction about the system of FIG. 1. Frequencies corresponding to 23 and 24 represent right hand circular polarization waves with frequency 23 travelling in a counterclockwise direction and frequency 24 travelling in a clockwise direction around the laser system illustrated in FIG. 1. These frequencies are shown as positive or negative differences from the center or maximum gain frequency of the laser 10.

When the system of FIG. 1 is rotated about an axis perpendicular to the plane of the laser path, frequencies 22 and 23 will both shift in one direction, while frequencies 21 and 24 will both shift in the opposite direction. For example, if the system is rotated in the clockwise direction, frequencies 22 and 23 will be reduced and frequencies 21 and 24 will be increased, and since frequencies 22 and 23 lie between frequencies 21 and 24, the separation between frequencies 21 and 22 will be reduced and the separation between frequencies 23 and 24 will be increased. The sum of the changes in said separations is directly proportional to the rate of rotation of the system of FIG. 1. This sum is separated from frequency shifts due to other causes, such as gain variation, or thermal changes in path length, by algebraically adding said changes, or deviations in said frequency separations. A decrease in such a frequency separation will have a negative sign and an increase in such a frequency separation will have a positive sign.

The direction of rotation is determined by the relative signs of said frequency deviations. For example, when the separation between frequencies 21 and 22 is less than the separation between frequencies 23 and 24, the system is rotating clockwise, and when the separation between frequencies 21 and 22 is greater than the separation between frequencies 23 and 24, the rotation is counterclockwise.

The four frequencies of the gyroscope are obtained from the small amount of laser wave energy which will pass through the mirror 14 in small quantities, for example less than one-tenth of one percent of the total energy of the beam. Clockwise propagating waves propagate through mirror 14 along the beam path shown at 30, whereas counterclockwise waves propagate along the beam path 31. The beams pass through quarter wave plates 32 of any desired type, such as, for example, quartz crystal plates oriented with the Z axis perpendicular to the beam and the X or Y axis parallel to the beam. The thickness of the plates 32 is chosen in accordance with well-known practice such that the circularly polarized waves are converted to linearly polarized waves, with the linearly polarized wave of each beam produced by the right hand circular polarization being substantially at right angles to the linearly polarized wave produced by the left hand circular polarization. The beams 30 and 31 are then each divided into two substantially equal amplitude beams by half silvered mirrors 33, the beams passing through half silvered mirrors 33 being reflected by mirrors 34 to produce four beams which are passed through four polarization analyzers 35. The polarization analyzers pass only one angle of linearly polarized wave and, by adjusting the rotational orientation of the analyzers 35, produce beams 41, 42, 43 and 44 having substantially only the frequencies 21, 22, 23 and 24, respectively.

Beams 41 and 42 are superimposed by means of a half silvered mirror 45 on a photodiode 46, and beams 42 and 43 are superimposed by means of a half silvered mirror 47 on a photodiode 48. Photodiodes 46 and 48 are back biased by means of batteries 49 and 50, respectively, and the difference frequency produced by photodiode 46 from the separation between frequencies 21 and 22 appears across load resistor 51, while the difference frequency produced by photodiode 48 from the separation between frequencies 23 and 24 appears across load resistor 52. The frequencies above these difference frequencies are filtered by the stray capacitance of the system and do not appear across resistors 51 and 52.

The difference frequencies are counted by counters 53 and 54, which may include forming or shaping circuits to generate digital pulses from the sinusoidal difference frequency waves in accordance with well-known practice. The output of counter 53 is subtracted from the output of counter 54 by means of an adder 55 which is connected to add the output of counter 53 as a negative number to the output of counter 54 as a positive number, in accordance with well-known counter practice. The output of the adder 55 is, therefore, a number directly proportional to the total amount of rotation of the laser system over the period of time during which the counters have counted. If the total count is positive, the output of counter 54 is greater than the output of counter 53 and the rotation is in the counterclockwise direction whereas, if the output is negative, the rotation is in the clockwise direction. In accordance with well-known computer practice, the counters may be made to repetitively count for predetermined periods and the count is then proportional to rotation rate.

The signals developed across resistors 51 and 52 will have an amplitude dependent on the position of the frequencies on the gain curve 90 illustrated in FIG. 2 and my be used to produce a control signal to center frequencies 21, 22, 23 and 24 symmetrically about the center frequency of curve 90. The amplitudes of these signals are detected by diodes 61 and 62, respectively, and appear across load resistors 63 and 64, respectively, whose outputs are sent through filter networks comprising resistors 65 and condensers 66, which determine the desired frequency response of the control signal loop to a differential amplifier 67, whose output drives a piezoelectric crystal supporting one of the mirrors 12. As shown here, the piezoelectric crystal is a block of quartz 68, having a back electrode 69 which may be part of the mechanical support (not shown), and a front electrode 70 supporting the mirror 12. The amplification and polarity of the differential amplifier 67 are selected to produce movement of the mirror 12 to compensate for mechanical movement of portions of the system with respect to each other, thereby keeping frequencies 21, 22, 23 and 24 positioned symmetrically about the center maximum gain frequency of the curve 90.

Figure 3:
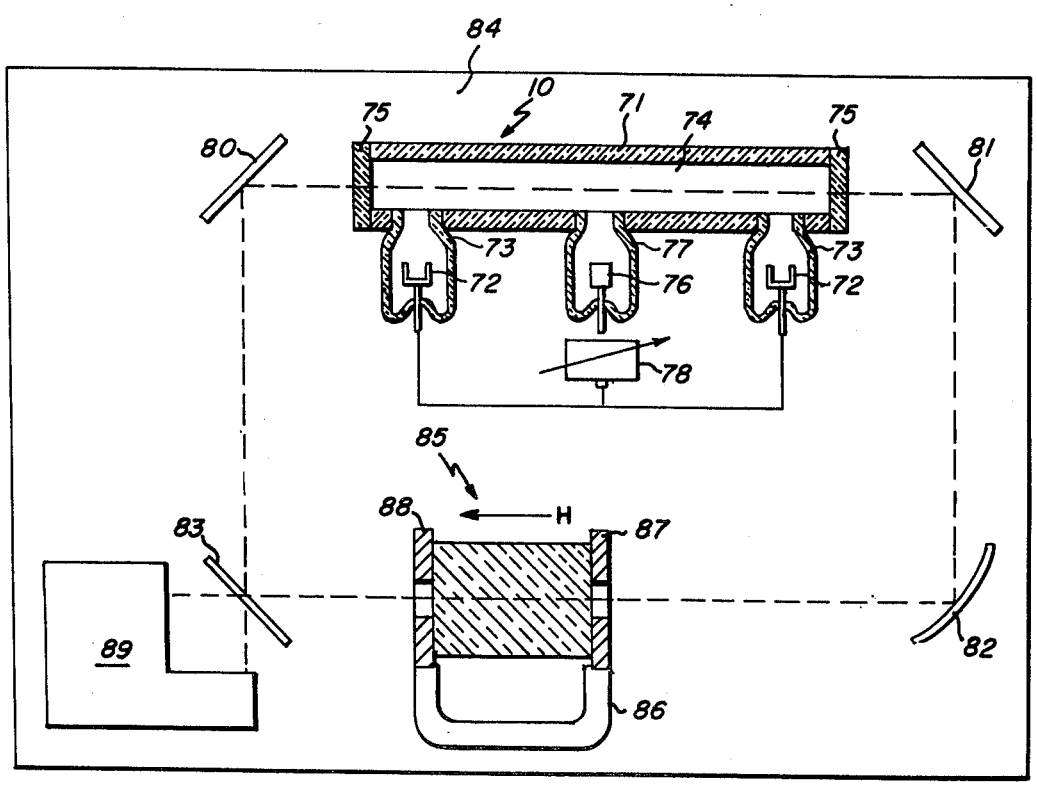
FIG. 3 illustrates a preferred embodiment of the system.

Referring now to FIG. 3, there is shown a preferred embodiment of the invention in which the laser 10 is a gas laser having a glass envelope 71 containing a mixture of neon and helium which will amplify wavelengths of approximately 6328 Angstroms. Two cathodes 72 are positioned in side arms 73 adjacent the ends of the laser 10 which are connected to the laser bore 74 extending between the ends of the glass body 71 and terminating at optical windows 75. An anode 76 is positioned in a side arm 77 connected to the laser bore 70 approximately midway between the cathode arms 75. Direct current electrical discharges are produced between the cathodes 72 and the anode 76 by means of a power supply 78 which is preferably of the adjustable constant current type.

The laser path is defined by four mirrors 80, 81, 82 and 83 positioned at the corners of a susbstantially rectangular path at substantially 45° with respect to the angles of incidence and reflection of the path. The entire assembly defining the path is mounted on a support 84 which provides a substantially rigid positioning of the elements to minimize fluctuation of the path length due to mechanical vibration. Support 84 is mounted on a system (not shown) whose rotation is to be measured. Mirrors 80, 81, 82 and 83 are made adjustable in accordance with well-known practice by mounts (not shown) in order to line up the laser beam along the rectangular path. One or more of the mirrors, such as mirror 82, is made concave to aid in concentrating the beam through the laser bore 74. The entire assembly may, if desired, be protected from errors due to the movement of gas along the laser path by evacuating all portions of the laser path other than those inside the gas filled envelope 71. Movement of the gas in the laser bore 74 due to the electrical discharge is compensated for since ion motion in the gas along the laser bore 74 is in both directions in the bore 74 from anode arm 77 toward each of the cathode arms 73. Therefore, when the laser is excited by a direct current discharge, equal and opposite motion of the gas particles occurs within the laser bore 74. The length of the bore 44 is made sufficient to overcome the losses in the laser signal along the reentrant path and may be, for example, 20 to 100 centimeters long. The total path length may be shortened by positioning additional lasers in the other legs of the rectangular path, and if desired, one or more mirrors may be made as portions of the windows 75 to reduce the loss.

In order to insure that the laser does not produce waves at frequencies other than in the desired molecular resonance band, the reentrant path is preferably made frequency responsive such that it has a lower loss at the desired resonance band of frequencies. Such a frequency responsive filter characteristic may be achieved by making one or more of the mirrors 12, 13, 14 and 15 of glass coated with several layers of low loss material of different dielectric constants, with the thickness of said coatings being substantially equal to a half wavelength of the desired frequency in each of the coating materials. Thus, at frequencies substantially different from the desired frequency band, the waves pass through the coating and the glass, hence making the reentrant path highly lossy at such other frequencies.

In the leg opposite to that containing the laser 10, there is shown a polarization dispersive structure 85 comprising a body of quartz crystal positioned with its Z, or optical axis parallel to the path of the laser beam.

This produces the reciprocal polarization dispersion produced by the element 17 in FIG. 1.

If the frequency separation produced by reciprocal polarization dispersion is relatively large, for example 150 megacycles, Faraday effect in the quartz crystal will produce a sufficient non-reciprocal polarization dispersion to produce a frequency separation of, for example, 0.1% of that produced by the reciprocal polarization dispersion. The Faraday rotation is produced by a permanent magnet 86 positioned between magnetic pole pieces 87 and 88 at the ends of the crystal 85 which produces a magnetic field axial to the laser beam. Pole pieces 87 and 88 have apertures therein to permit passage of the laser beam. Since variations in the magnetic field produce frequency shifts which cancel in output signal, the size of the magnetic field is not critical and is selected for the length of crystal 85 to produce a sufficient non-reciprocal polarization shift in accordance with the known physical constants of quartz. Any materials which have the desired reciprocal polarization dispersion and non-reciprocal Faraday polarization dispersion can be used in place of quartz. For the present embodiment a quartz crystal length of approximately 4 millimeters and a magnetic field strength of 2000 gauss will produce the desired frequency separations.

Light coupled out of the system, for example, as small amounts transmitted through mirror 83, will impinge on an output structure 89 comprising quarter wave plates, half silvered mirrors, polarization analyzers and photodetectors of any desired configuration such as, for example, that illustrated in FIG. 1. For the embodiment illustrated in FIG. 3 the laser will have a relatively sharp amplification curve due to the molecular resonance illustrated as curve 90 in FIG. 2 in which the half power points are spaced about 1000 megacycles apart as illustrated by the points 91. In such a system having relatively long laser path length, adjacent modes of oscillation can appear above the half power points. These modes are, for the configuration shown, between 300 and 400 megacycles away from the desired operating frequencies 21, 22, 23 and 24, as illustrated at frequencies 92. Since the curve 90 is essentially a Gaussian distribution of gain versus frequency, the gain of the system may be adjusted by adjusting supply 70 so that the loop gain is less than unity for frequencies in those regions of curve 90 in which the adjacent modes 92 lie, for example, as shown by the portion of curve 90 below line 93. The modes 92 will then not be excited, and any differences in frequency which those modes might introduce will be eliminated.

If desired, the adjacent modes may be excited and under these conditions the system may be operated with the frequency separation due to non-reciprocal Faraday rotation not exceeding a few hundred kilohertz. The output photodetectors, for example 46 and 48 in FIG. 1, can then be designed along with the load resistors 51 and 52 to have shunt capacitance which filters out all frequencies above one megahertz or so and, therefore, the frequency differences appearing in the outputs will be bands of frequencies a few cycle wide representing the variation in the frequency separation between the main frequencies and their adjacent modes. These small bands can be averaged in the computer counters 53 and 54 or in a frequency discriminator circuit in accordance with well-known practice. In this mode of operation, stabilization of the path length, for example by a quartz crystal on a mirror, can, if desired, be eliminated since adjacent modes will always be within the gain curve.

It should be clearly understood that the details of the foregoing embodiments are set forth by way of example only, and any type of laser could be used. The width of the gain curve can be adjusted by adjusting gas mixtures and operating currents, and solid lasers using, for example, ruby, neodymium doped yttrium aluminate garnet, or neodymium doped yttrium orthoaluminate may be used. While, in general, the accuracy of the system for a given size increases with the frequency region, it is contemplated that the principles of this invention are equally applicable at lower frequencies, such as for example the microwave region, and that amplifiers such as semiconductor devices can be used in place of the distributed laser amplifier illustrated herein. Accordingly, it is contemplated that this invention be not limited by the particular details of the embodiments illustrated herein except as defined by the appended claims.

What is claimed is:

1. The method comprising the steps of:
    simultaneously directing a plurality of radiant energy waves having at least a plurality of substantially coherent frequencies in opposite directions through a polarization dispersive medium;
    amplifying said waves in an amplifying medium which is common to at least a portion of the path of each of said waves;
    deflecting said waves at a plurality of points in said path with reflecting filter means; and
    varying the frequencies of said waves by moving said mediums and said reflecting filter means as a unit.
2. The method in accordance with claim 1 wherein:
    said step of deflecting said waves comprises reflecting all of said waves from each of a plurality of frequency responsive filter means spaced along said path.
3. The method in accordance with claim 2 wherein:
    said step of varying said frequencies comprises shifting said frequencies in opposite directions as a function of the rotation of said path around an axis.
4. The method in accordance with claim 1 wherein:
    said step of amplifying said waves comprises producing a population inversion in at least one of a plurality of possible energy states in said amplifying medium.
5. The method in accordance with claim 1 wherein:
    said band of frequencies has a free space wavelength in the region of 6,328 Angstroms.
6. The method in accordance with claim 1 wherein:
    said step of directing said plurality of substantially coherent frequencies through a polarization dispersive medium comprises directing said waves through a medium providing reciprocal polarization dispersion and nonreciprocal polarization dispersion of said waves.
7. The method in accordance with claim 1 wherein:
    said amplifying medium comprises a gaseous mixture of helium and neon.
8. The method in accordance with claim 7 wherein:
    said step of amplifying said waves comprises producing a population inversion in at least one of a plurality of energy states in said amplifying medium.
9. The method in accordance with claim 1 wherein:
    said step of directing said waves comprises directing at least two pairs of waves in mutually opposite directions through said medium.
10. The method in accordance with claim 9 wherein:
    said step of varying said frequencies by moving said mediums comprises rotating said path about an axis.

* * * * *